United States Patent
Shaver et al.

(10) Patent No.: US 7,400,993 B2
(45) Date of Patent: Jul. 15, 2008

(54) METHOD AND SYSTEM FOR ACCURACY OF SPEED AND ACCELERATION MEASUREMENTS ON ROTATING MACHINERY WITH A SPEED WHEEL

(75) Inventors: Stephen Mark Shaver, Rocky Mount, VA (US); John N. Cunningham, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/590,597

(22) Filed: Oct. 31, 2006

(65) Prior Publication Data
US 2008/0110283 A1    May 15, 2008

(51) Int. Cl.
G01B 7/30 (2006.01)
G01P 3/00 (2006.01)
G01R 35/00 (2006.01)

(52) U.S. Cl. .................. 702/106; 73/514.39; 73/117.3; 324/207.12; 324/207.25; 324/202

(58) Field of Classification Search ......... 702/104–108, 702/97; 361/236; 416/35; 73/117.3, 514.39; 324/202, 207.12, 207.25
See application file for complete search history.

(56) References Cited

U.S. PATENT DOCUMENTS

| 4,434,470 | A | | 2/1984 | Thomas | |
|---|---|---|---|---|---|
| 5,170,365 | A | * | 12/1992 | Collopy et al. | 702/106 |
| 5,541,859 | A | * | 7/1996 | Inoue et al. | 702/148 |
| 5,559,705 | A | * | 9/1996 | McClish et al. | 701/110 |
| 5,622,154 | A | * | 4/1997 | Wrobel | 123/476 |
| 5,628,291 | A | * | 5/1997 | Wrobel et al. | 123/357 |
| 5,789,658 | A | * | 8/1998 | Henn et al. | 73/1.37 |
| 5,864,775 | A | * | 1/1999 | Bradshaw et al. | 702/104 |
| 6,446,018 | B1 | * | 9/2002 | Isermann et al. | 702/96 |

* cited by examiner

*Primary Examiner*—Edward Lefkowitz
*Assistant Examiner*—Jonathan Dunlap
(74) *Attorney, Agent, or Firm*—Ernest G. Cusick; Edward J. Smith (57) ABSTRACT

A method and system for calculation of rotation dependent parameters in a system that senses shaft rotation of a toothed speed wheel. The method includes determining the passing edges of multiple gear teeth on a rotating speed wheel; calculating rotational speed of the rotating machine based on the passing edges of multiple gear teeth of the speed wheel; calculating a rotation independent tooth spacing correction factor for each gear tooth on the rotating wheel; and correcting the calculated rotational speed of the rotating machine using the tooth corrections.

16 Claims, 6 Drawing Sheets

METHOD AND SYSTEM FOR ACCURACY OF SPEED AND ACCELERATION MEASUREMENTS ON ROTATING MACHINERY WITH A SPEED WHEEL

BACKGROUND OF THE INVENTION

The invention relates generally to a method and system for improving the accuracy of calculation of rotation dependent parameters in a system that senses multiple pulses associated with shaft rotation and more specifically for improving the accuracy of speed-and acceleration readings from pulse rate sensors on a rotating shaft of rotating equipment, such as turbines. However, the invention is applicable to any rotating device that needs multiple speed, velocity, or acceleration readings per revolution (e.g., engines, generators and drive shafts).

Previous methods for measurement of speed have been addressed, for example, by U.S. Pat. No. 4,434,470 by Robert C. Thomas et al. Thomas et al. describes a method for calculation of speed in Revolutions Per Minute (RPM) using speed pulses. A digital speed measurement circuit for an engine includes a magnetic pick-up positioned adjacent to an engine-driven gear having a substantial number of teeth so the pick-up produces a number of speed pulses per revolution of the gear. These pulses are shaped into square waves by a signal conditioning circuit and connected through a synchronizing circuit, which responds to the trailing edge of each square wave to produce a triggering pulse, with each triggering pulse supplied to a tooth counter. A high-speed clock is connected to a second counter, which is reset with each triggering pulse. Sampling pulses are produced in an associated control system which is not coordinated with the speed pulse but which are longer in duration than any of the speed pulses and which control the flow of tooth counts to the tooth counter. Memory circuits retain the speed counters measuring the intervals between a triggering pulse and the beginning of a sampling pulse and between the end of the sampling pulse and the triggering pulse immediately preceding. Another counter counts the high-speed counts occurring during the sampling pulse period. These factors are combined as described to provide a high-speed count of a new measuring interval exactly related to the speed pulse and which is combined with the speed pulse count to provide a digital signal which accurately represents a desired function of engine rotational speed.

However, other parameters that are also rotation dependent may be measured using a sensor tied to the rotation. For example, a flow meter may depend upon the rotation of a volumetric-related device, the flowrate being related directly to a measure (speed) of rotation of the device. Where the measure of speed of rotation of the device is based on the passing of teeth of a speed wheel, the flowrate measurement will be similarly dependent on the passing of teeth.

The SPEEDTRONIC* (*SPEEDTRONIC is a trademark of the GENERAL ELECTRIC Company) MK VI-e Turbine Control System utilizes a speed or tooth wheel for sensing speed related parameters for a turbine control system. A stream of pulses, typically from a magnetic pickup sensor positioned over the tooth wheel or from a flow rate sensor, is generated as the sensor passes an edge of the tooth.

Figure 1:
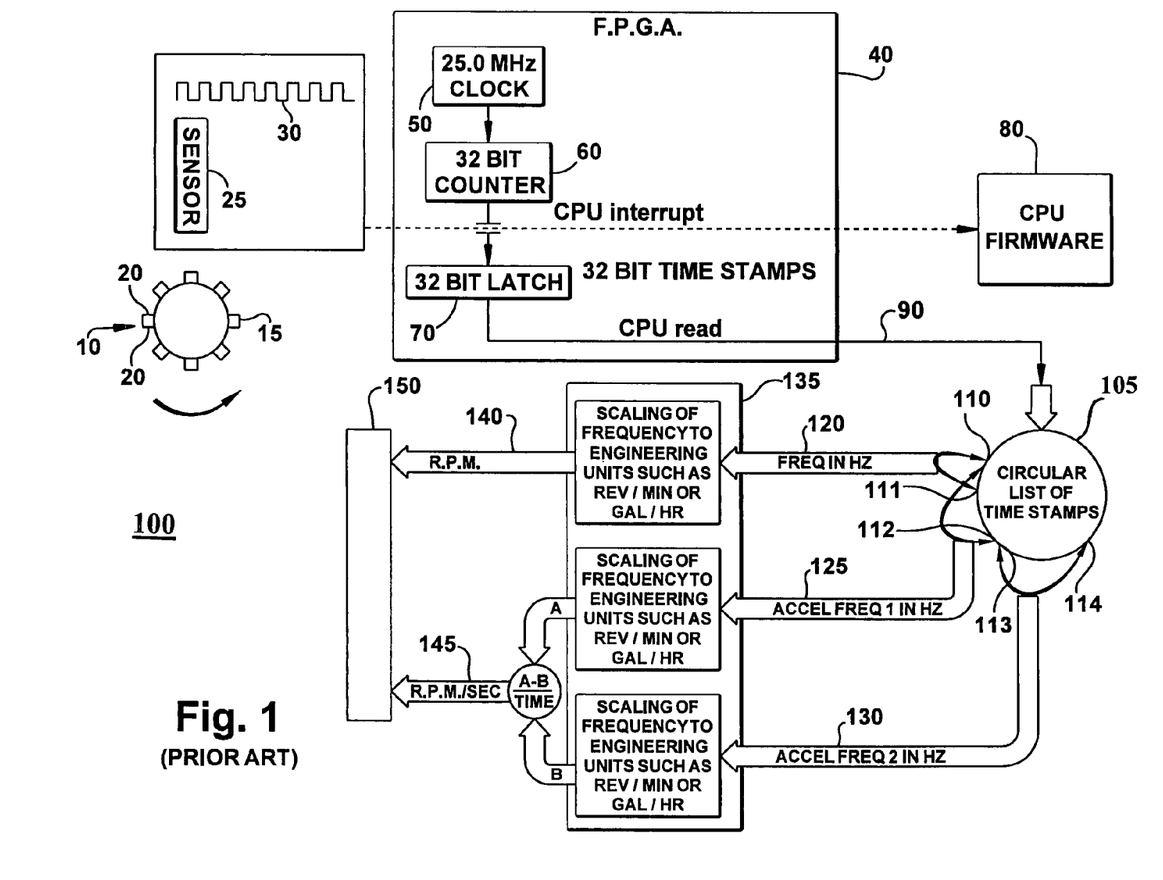
FIG. 1 illustrates a prior art system for calculating the frequency, speed, and acceleration of rotation based on sensing multiple pulses during each revolution of a speed wheel.

FIG. 1 illustrates an exemplary system 100 for frequency, speed and acceleration measurements using a speedwheel. The speedwheel 10 rotates in a known relationship to the rotation of the shaft of the equipment being monitored. The illustrative example shows a speedwheel 10 with eight teeth 15. A magnetic pickup sensor 25 senses a passing an edge 20 of each tooth 15 and generates analog pulses (not shown) These analog pulses are converted by hardware (not shown) into digital pulses 30, which feed into the input of a field programmable gate array (FPGA) 40 or other equivalent hardware device.

The FPGA 40 contains a 25.0 MHz clock 60 and a 32 bit free-running counter 60. The value from the free-running counter 60 is latched into a 32 bit latch 70 whenever a rising edge of the pulse input occurs (a falling edge may be used as well).

Elements of the 32 bit latch 70 contain a 32-bit value of the 25.0 MHZ free-running counter 60 that is captured when a tooth edge of a toothed speed wheel 10 is sensed. These elements will be referred to as TICS. The CPU 80 uses the contents of the 32 bit latch to calculate frequency, speed and acceleration. When a read 90 is performed by the CPU 80, the elements are assigned a time stamp and made available in a circular list of time stamps 105. The arrows 110-114 on the circular list of time stamps 105 represent specific events being picked off for determination of individual rotation-related parameters. For example, arrows 110-111 represent the time stamps associated with two successive events (the sensing of tooth edges) upon which a calculation to determine frequency 120 will be performed. Similarly, arrows 110/112, and 113/114 represent the time stamps for the two events providing inputs for speed calculations associated with speed signals 125 and 130, upon which an acceleration signal 145 will be calculated. The above describes a current method of implementation of pulse sensing, storage and recovery, however, such a process may be implemented by various other hardware and software combinations, as known in the art.

Equation 1 describes the frequency (Freq) of the speed wheel rotation in Teeth/Sec, where TICS represents elements of the 32 bit latch 60 storing counter values associated with pulses, $t_n$ represents a pointer to the latest TIC entry in the 32 bit latch elements, and $t_{n-1}$ is the pointer one entry back from $t_n$. The Freq is calculated as the inverse of the difference between TIC readings (in counts) at successive pulse edges (at $t_n$ and $t_{n-1}$) divided by the 2500000 (count value for a full second of the 25 MHz counter).

$$Freq(\text{Hz}) = \frac{1}{\frac{(TICS[t_n] - TICS[t_{n-1}])}{25000000}} \left(\frac{\text{Teeth}}{\text{Sec}}\right) \quad \text{Equation 1}$$

Equations 2 and 3 describe the speed of the turbine over two successive intervals determined by the TICs at three successive pulses (Speed$_1$ determined by TICs at $t_n$ and $t_{n-1}$ and Speed$_0$ determined by the TICs at $t_{n-1}$ and $t_{n-2}$).

$$Speed_1 = \frac{1}{\frac{(TICS[t_n] - TICS[t_{n-1}])}{25000000}} \left(\frac{\text{Teeth}}{\text{Sec}}\right) \quad \text{Equation 2}$$

$$Speed_0 = \frac{1}{\frac{(TICS[t_{n-1}] - TICS[t_{n-2}])}{25000000}} \left(\frac{\text{Teeth}}{\text{Sec}}\right) \quad \text{Equation 3}$$

Equation 4 describes the acceleration of the turbine as the difference between two successive speed calculations ($Speed_1 - Speed_0$) divided by the period for the associated three successive pulses.

$$\text{Acceleration}\left(\frac{Hz}{Sec}\right) = \frac{Speed_1 - Speed_0}{\frac{(TICS[t_n] - TICS[t_{n-2}])}{25000000}} \left(\frac{Teeth}{Sec^2}\right) \quad \text{Equation 4}$$

The calculated frequency (teeth/sec) and acceleration (teeth/sec$^2$) may then scaled to engineering units (for example Revolution/Minute or Gallons/Hour) by a scaling function 135, and output to a system controller 150. The system controller 150 utilizes the speed input 140 and the acceleration input 145, along with other system inputs (not shown) for turbine control.

Figure 2:
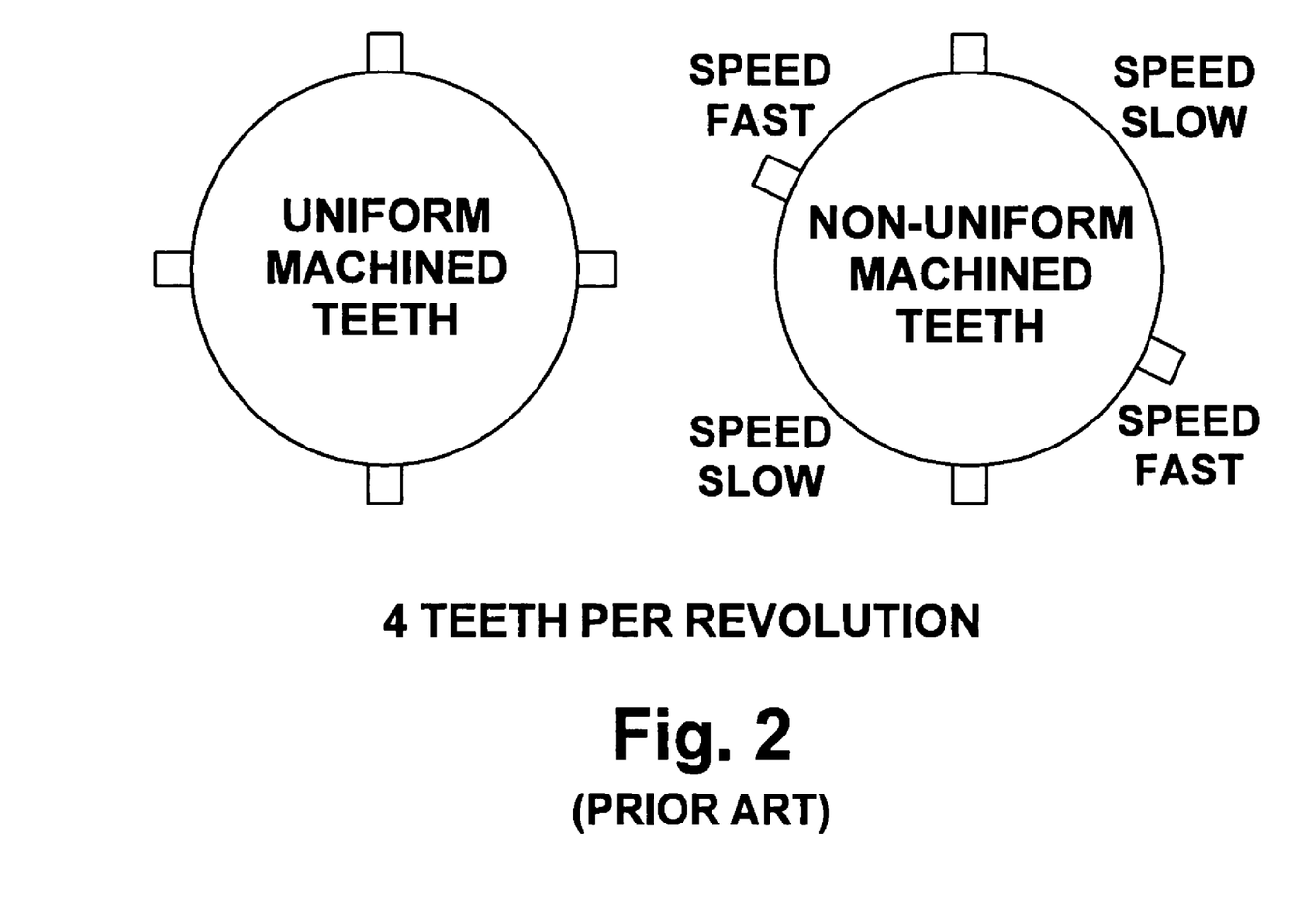
FIG. 2 illustrates a simplified rendition of uneven tooth spacing in a simplified 4 tooth speed wheel.

The turbine continually controls and maintains its speed, by increasing or decreasing the volume of gas or steam via control valves. These valves are commanded by the control system, which uses the speed calculated from the pulse rate sensor inputs. The inherent assumption in the speed and acceleration equations is that the tooth edges are uniformly distributed around the circumference of the speed wheel. However as shown on a simplified 4 tooth speed wheel in FIG. 2, the distribution of the tooth spacing may not be uniform.

Figure 3:
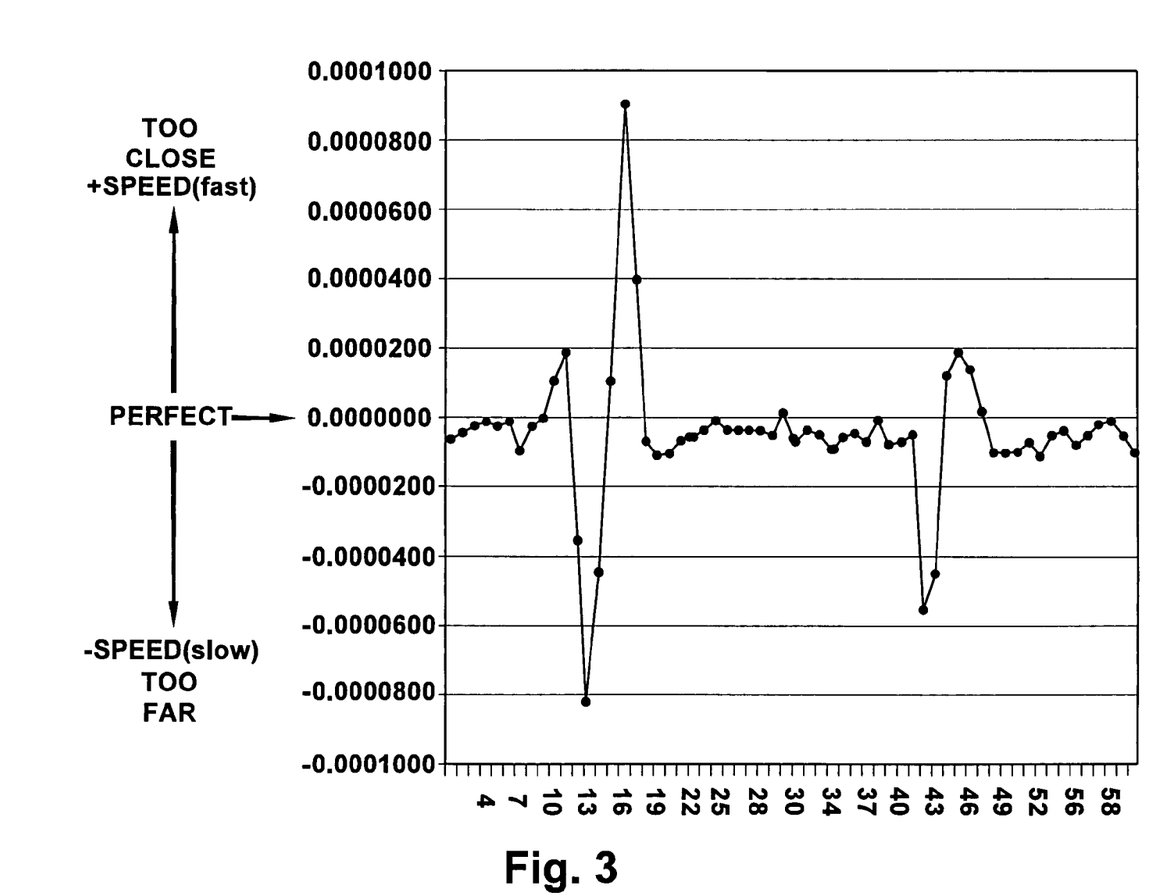
FIG. 3 illustrates the milling error in tooth edge position for a 60 tooth speed wheel.

FIG. 3 illustrates the imperfect milling of a typical 60 tooth speed wheel. When the tooth or gear spacing is non-uniform, the time between pulses created by the tooth edges will vary, even though the turbine's shaft speed is constant. If the edges for successive teeth are too close, then the calculated speed will be faster than the actual speed. If the edges for successive teeth are too far apart, then the calculated speed will be slower than the actual speed. An apparent oscillation will occur in the calculated speed when it is assumed that the tooth spacing is uniform, but the tooth spacing is actually non-uniform. This speed variation will cause the control system to continuously correct the turbine's speed, and will cause premature, excessive wear of mechanical control components.

Tooth edge variation of the speed wheel may be corrected by re-machining the teeth in the field to reduce the errors. This corrective action is not cost effective and undesirable.

Other solutions have been proposed for correction of speed calculations. The calculations can be filtered, but this introduces a control lag. The formulas can be changed to use every 2nd, 3rd, 4th TIC, but this results with the same oscillation problem. A more direct solution is to use the same tooth each revolution. That corrects the oscillation problem, but again introduces a lag. At low speeds this lag may be unacceptable.

It would therefore be desirable to provide an algorithm for calculating the speed of the rotating shaft of the rotating equipment such that oscillation, in the calculated speed that results from non-uniform spacing of gear teeth, is eliminated.

BRIEF DESCRIPTION OF THE INVENTION

Briefly, in accordance with one embodiment of the present invention, a method is provided for calculating rotation-dependent parameters in a system that senses multiple teeth during a single shaft rotation of a toothed speed wheel. The method includes sensing passing edges of multiple gear teeth on the toothed speed wheel; generating a signal pulse at one of rising and falling edges of the gear teeth; measuring time between the generated signal pulses; calculating a tooth correction for the span between at least one of rising and falling edges of successive gear teeth; and applying the tooth correction to the rotation-dependent parameter calculation.

In accordance with a second aspect of the present invention, a method for calculating rotation-dependent parameters in a system that senses multiple teeth during a single shaft rotation of a toothed speed wheel. The method includes sensing passing edges of multiple gear teeth on the toothed speed wheel; generating a signal pulse at one of rising and falling edges of the gear teeth; measuring time between the generated signal pulses; calculating filtered tooth corrections for the spans between at least one of rising and falling edges of successive gear teeth; and applying the tooth corrections to the rotation-dependent parameter calculations according to:

$$Freq(Hz) = \frac{span}{\frac{(TICS[t_n] - TICS[t_{n-span}])}{25000000}} \cdot \left(\frac{Teeth}{Sec}\right) \cdot \left(\frac{\sum_{i=ti}^{ti-span} \text{Filtered\_correction}[i]}{\sum \text{Filtered\_corrections}}\right) \cdot \left[\frac{Teeth}{rev}\right]$$

where span represents the number of teeth that passed the pulse input sensor in x ms (minimum of 1); TICS represents circular buffer elements storing counter values associated with pulses; N represents the number of teeth on the speed wheel; $t_n$ represents a pointer to the latest TIC entry in a circular buffer; $t_{n-1}$ is the pointer one entry back from $t_n$, $t_{n-k}$ is the pointer k entries back from $t_n$, [ti] represents $t_n$ Modulus N; tooth correction [ti] represesents the tooth correction associated with an individual span; and $t_{n+span}$ as the pointer x ms back from tc; and 4) $t_{n+(2*span)}$ as the pointer 2*x ms back from tc.

Yet a further aspect of the present invention provides a system for calculation of rotation dependent parameters by sensing shaft rotation of a toothed speed wheel. The system include a rotating device including a speed wheel with multiple teeth; a sensor means for determining the edges for the multiple teeth as the speed wheel rotates; a counting means for timing the passing of the edges for successive teeth of the speed wheel; a storing means for storing the time of the passing of the edges for successive teeth of the speed wheel; a calculating means for determining the passage of time between the edges for successive teeth of the speed wheel; a correcting means for determining the a correction for the speed of the speed wheel based on uneven spacing of the tooth edges around the circumference of the speed wheel.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The embodiments of the present invention have many advantages, including improvement of accuracy of rotation-dependent parameters for rotating machinery provided with a toothed speed wheel.

Compensation may be provided for tooth variations automatically, without physically measuring each tooth or re-machining the speed wheel. Physical spacing from tooth to tooth is determined at the time of manufacture and cannot change. This spacing can be represented as a percent of total wheel. Tooth spacing is also constant, and independent of speed of the shaft At a periodic rate of 1 millisecond, the CPU reads the FPGA buffer, and moves all new elements into the CPU's larger circular buffer in memory. A tooth correction (ratio) in a table can be calculated for each tooth in the wheel that passes.

Provided the turbine and the speed wheel is rotating at a constant speed and the edges for the teeth are evenly spaced around the circumference of the speed wheel, the number of TICs between each successive rising edge or each successive falling edge should be equal. The total time for one full revolution of the speed wheel should simply be the measured TIC for any tooth-to-tooth span multiplied by N where N is the number of teeth per revolution. However, due to the manufacturing errors in cutting the teeth, the edges are not perfectly spaced.

The tooth correction is generated for each span between edges for successive teeth using the circular buffer element according to Equation 5.

The parameter ti is defined as $t_n$ modulus N where N is the number of teeth per revolution. The parameter $t_n$ modulus N tracks each individual span during successive rotations. For example, with a 60 tooth speed wheel, after two full revolutions plus rotation of two more tooth spans, the counter would have advanced 122 positions. The parameter $t_n$ would assume a value of 122. The value of ti would be determined as 122 modulus 60, which is 2, thus informing that the correction value is associated with the second span.

The tooth correction for each span determines the fractional part of a full revolution that is attributed to the span between successive tooth edges while the speed wheel is rotating at a constant speed. The time for one span is represented by the numerator as the difference between the TICs at $t_n$ and the TICs at $t_{n-1}$. The summation of TICs in the denominator represents the total time in TICs for a full rotation of the speed wheel. If the numerator represents a smaller portion of the total fraction than would be expected by an equal spacing of the tooth edges, then the Correction [ti] (when used as a multiplier for a speed calculation) will reduce the calculated speed. Similarly, if the numerator represents a larger portion of the total fraction than would be expected by an equal spacing of the tooth edges, then the Correction [ti] (when used as a multiplier for a speed calculation) will increase the calculated speed.

$$\text{Correction}[ti] = \frac{TICS[t_n] - TICS[t_{n-1}]}{\sum_{k=0}^{N-1} TICS[t_{n-1}]} \quad \text{Equation 5}$$

Table 1 provides a simple example of the tooth correction of Equation 5 applied to the rotation of a 4 tooth speed wheel with uneven spacing between edges. In this example, the design spacing between the tooth edges (in TICS) for even spacing at a first speed would be 9. The measured TICS for the four successive tooth edges at the first speed of rotation are 10, 8, 10, and 8 respectively, identifying uneven spacing between tooth edges. The design spacing for even spacing between successive tooth edges, in TICs, for the four successive tooth edges at the second speed is 4.5. The measured TICs for the second speed, which is twice the first speed of rotation, are 5, 4, 5 and 4, respectively.

TABLE 1

| Rotation Speed | Delta TICS | Correction Span 1 | Correction Span 2 | Correction Span 3 | Correction Span 4 |
|---|---|---|---|---|---|
| First Speed | 10, 8, 10, 8 | 10/36 (.278) | 8/36 (.222) | 10/36 (.278) | 8/36 (.222) |
| Second Speed (2 * First Speed) | 5, 4, 5, 4 | 5/18 (.278) | 4/18 (.222) | 5/18 (.278) | 4/18 (.222) |

As may be seen from Table 1, the tooth correction is independent of speed. This results since the TIC values, used in both the numerator and denominator of correction Equation 5, increase or decrease inversely proportionally with speed of rotation.

The CPU at a ten-millisecond rate, applies the contents of CPU's circular buffer and the tooth correction to calculate Speed and Acceleration according to the correction formulas.

Equation 6 describes the frequency calculated as in Equation 1, but corrected with the tooth correction.

$$Freq(\text{Hz}) = \frac{1}{\frac{(TICS[t_n] - TICS[t_{n-1}])}{25000000}} \left(\frac{\text{Teeth}}{\text{Sec}}\right) * (\text{tooth correction}[ti]) * \left[\frac{\text{Teeth}}{rev}\right] \quad \text{Equation 6}$$

Similarly, Equations 2 and 3 are modified by the tooth correction to yield Equation 7 and Equation 8.

$$Speed_1 = \frac{1}{\frac{(TICS[t_n] - TICS[t_{n-1}])}{25000000}} \left(\frac{\text{Teeth}}{\text{Sec}}\right) * (\text{tooth correction}[ti]) * \left[\frac{\text{Teeth}}{rev}\right] \quad \text{Equation 7}$$

$$Speed_0 = \frac{1}{\frac{(TICS[t_{n-1}] - TICS[t_{n-2}])}{25000000}} \left(\frac{\text{Teeth}}{\text{Sec}}\right) * (\text{tooth correction}[ti-1]) * \left[\frac{\text{Teeth}}{rev}\right] \quad \text{Equation 8}$$

Use of corrected speed values in Equation 7 and Equation 8 provides a corrected acceleration value in Equation 9.

$$\text{Acceleration}\left(\frac{\text{Hz}}{\text{Sec}}\right) = \frac{Speed_1 - Speed_0}{\frac{(TICS_{t_n} - TICS_{t_{n-2}})}{25000000}}\left(\frac{\text{Teeth}}{\text{Sec}^2}\right) \quad \text{Equation 9}$$

Use of the tooth correction is a simple and elegant solution to the problem of non-uniform teeth spacing when the rotation is at a constant speed. However, if the speed varies during a single revolution, the correction value may be miscalculated temporarily. This case occurs when the turbine changes speed within a single revolution of the shaft. This case is easily detected by the fact that the actual spacing of the teeth is physically fixed, therefore independent of speed. Under changing speed within a given revolution, the calculated tooth correction for the teeth will change, becoming a larger or smaller value, but the actual spacing does not.

The calculated tooth correction for each span is stored in a table of tooth corrections. During each rotation of the speed wheel a new tooth correction is calculated for each span. The tooth corrections are then tested to determine if they should be applied in a table of filtered tooth corrections that are used in final equations for calculated Freq, $Speed_1$ and $Speed_0$.

The values of the calculated tooth corrections for each span can be compared from one determination to the next determination for the same span. Since the actual tooth spacing is fixed, if the calculated new tooth correction changes significantly, this indicates that the speed of rotation has changed or some other abnormality has occurred in the tooth correction determination, and the new calculated new tooth correction factor should not be used for a speed determination A limit may be set to determine if the new tooth correction should be used for the speed determination. A limit of about 1% may be set for the tooth correction change. If the tooth correction change is less or equal to the limit, then a latched or filtered tooth correction table may be updated with the tooth correction value. Otherwise, if the tooth correction change is greater than the limit, then the latched or filtered tooth correction table should not be updated with the tooth correction until a full revolution of the shaft has passed with tooth corrections for all the gear teeth spans within the limit. This is a reasonable approach since the tooth spacing did not change, and use of the limit will prevent the latched or filtered tooth correction table being updated with a miscalculated value.

Operationally, the system employs an algorithm comparing the absolute value of the difference between the new tooth correction and the old tooth correction against the LIMIT value times the old tooth correction. If the difference is less than or equal to the LIMIT value times the old tooth correction, then the tooth correction within the tolerance counter should be updated with the new tooth correction value. If the difference is greater than the LIMIT value times the old tooth correction, then the tooth correction within the tolerance counter should be set to zero:

If

|New Tooth Correction[$ti$]−Old Tooth Correction[$ti$]|<=(LIMIT*Old Tooth Correction[$ti$]), Then Tooth Corrections Within TolerenceCounter=Tooth Correction Within TolerenceCounter+1;

Else Tooth Corrections within tolerenceCounter=0.

If the new tooth correction factor for any individual span [$ti$] falls within the limit L, then the new tooth correction factor updated in the tolerance counter should be applied with weighting factors W1 and W2 to calculate a filtered tooth correction [$ti$] according to Equation 10.

Filtered_correction[$ti$]=(Filtered_correction[$ti$]*W1)+ (tooth correction[$ti$]*W2)     Equation 10

The weighting factors W1 and W2 may preferentially be assigned values of 0.9 and 0.1 respectively, leading to Equation 11. The preferred weighting values prevent a single erroneous new tooth correction from skewing the filtered tooth correction, but at the same time permits the updating of the filtered tooth correction within a reasonable time frame.

Filtered_correction[$ti$]=(Filtered_correction[$ti$]*0.9)+ (tooth correction[$ti$]*0.1)     Equation 11

Further, if the tooth correction factor calculation for an individual span [$ti$] varies outside the limit LIMIT, then the filtered tooth correction values should not be updated until at least one full revolution later for which all tooth correction factor calculations have fallen within the limit LIMIT.

Using a filter for the tooth corrections may introduce an insignificant error. The sum of all the filtered tooth correction elements will be close to 1.0, but may not be exactly 1.0. This is due to the lag in a filter's result. To normalize the determined values for the filtered tooth correction values, the individual filtered tooth correction factor value for a specific span [$ti$] is divided by the summation of the filtered tooth correction factor values for all the spans during the last revolution.

The final formulas for $Freq_F$, $Speed_{1F}$, $Speed_{0F}$ and $Acceleration_F$ with filtered tooth correction factors are expressed as Equation 12, Equation 13, Equation 14 and Equation 15, respectively.

$$Freq_F(\text{Hz}) = \frac{1}{\frac{(TICS[t_n] - TICS[t_{n-1}])}{25000000}}\left(\frac{\text{Teeth}}{\text{Sec}}\right)*\left(\frac{\text{Filtered\_correction}[ti]}{\sum \text{Filtered\_corrections}}\right)*\left[\frac{\text{Teeth}}{\text{rev}}\right] \quad \text{Equation 12}$$

$$Speed_{1F} = \frac{1}{\frac{(TICS[t_n] - TICS[t_{n-1}])}{25000000}}\left(\frac{\text{Teeth}}{\text{Sec}}\right)*\left(\frac{\text{Filtered\_correction}[ti]}{\sum \text{Filtered\_corrections}}\right)*\left[\frac{\text{Teeth}}{\text{rev}}\right] \quad \text{Equation 13}$$

$$Speed_{0F} = \frac{1}{\frac{(TICS[t_{n-1}] - TICS[t_{n-2}])}{25000000}}\left(\frac{\text{Teeth}}{\text{Sec}}\right)*\left(\frac{\text{Filtered\_correction}[ti-1]}{\sum \text{Filtered\_corrections}}\right)*\left[\frac{\text{Teeth}}{\text{rev}}\right] \quad \text{Equation 14}$$

$$\text{Acceleration}_F\left(\frac{\text{Hz}}{\text{Sec}}\right) = \frac{Speed_1 - Speed_0}{\frac{(TICS[t_n] - TICS[t_{n-2}])}{25000000}}\left(\frac{\text{Teeth}}{\text{Sec}^2}\right) \quad \text{Equation 15}$$

At a periodic rate of about 10 milliseconds, the CPU, using the circular buffer's tic information, may calculate the speed and acceleration. It then may apply the filtered tooth correction factor, scales, and output the results to the system controller.

Further, the filter must be initialized upon power up, a lost or invalid pulse or occurrence of a zero speed. When initialized, the filter is set to a value of 1.0/teeth_per_rev. This makes the new algorithm act like the old algorithm until the tooth correction value is updated. Using the filter algorithm of Equation 11, at least 10 revolutions of the shaft must occur before its final value is reached. To speed the filter up for these cases, the tooth correction table values may be copied directly into the filter after a predetermined number of revolutions. For example, the tooth correction table values may be copied when the predetermined number of revolutions equals 3.

According to another aspect of the present invention, the above equations may be modified to use a span in ms, instead of tics.

For this aspect of the present invention the following definitions may be provided as follows: 1) span as the number of teeth that passed the pulse input sensor in x ms (Minimum of 1); 2) $t_n$ as the pointer to the latest TIC entry in the circular buffer; 3) $t_{n+span}$ as the pointer x ms back from $t_n$; and 4) $t_{n+(2*span)}$ as the pointer 2*x ms back from $t_n$.

The frequency (FREQ) may then be described as Equation 14.

$$Freq(\text{Hz}) = \frac{\text{span}}{\frac{(TICS[t_n] - TICS[t_{n-span}])}{25000000}} \left(\frac{\text{Teeth}}{\text{Sec}}\right) * \left(\frac{\sum_{i=ti}^{ti-span} \text{Filtered\_correction}[i]}{\sum \text{Filtered\_corrections}}\right) * \left[\frac{\text{Teeth}}{\text{rev}}\right]$$

Equation 14

This allows the user to specify in milliseconds the number of TIC samples, used in the calculation of speed and acceleration.

According to a further aspect of the present invention an system is provided to perform the method for the calculation of rotation dependent parameters of a rotating device by sensing a shaft rotation of a toothed speed wheel. Multiple pulses from the toothed speed wheel are sensed during a single rotation of the speed wheel or an equivalent device whose output is related in a known manner to the rotating device.

Figure 4A:
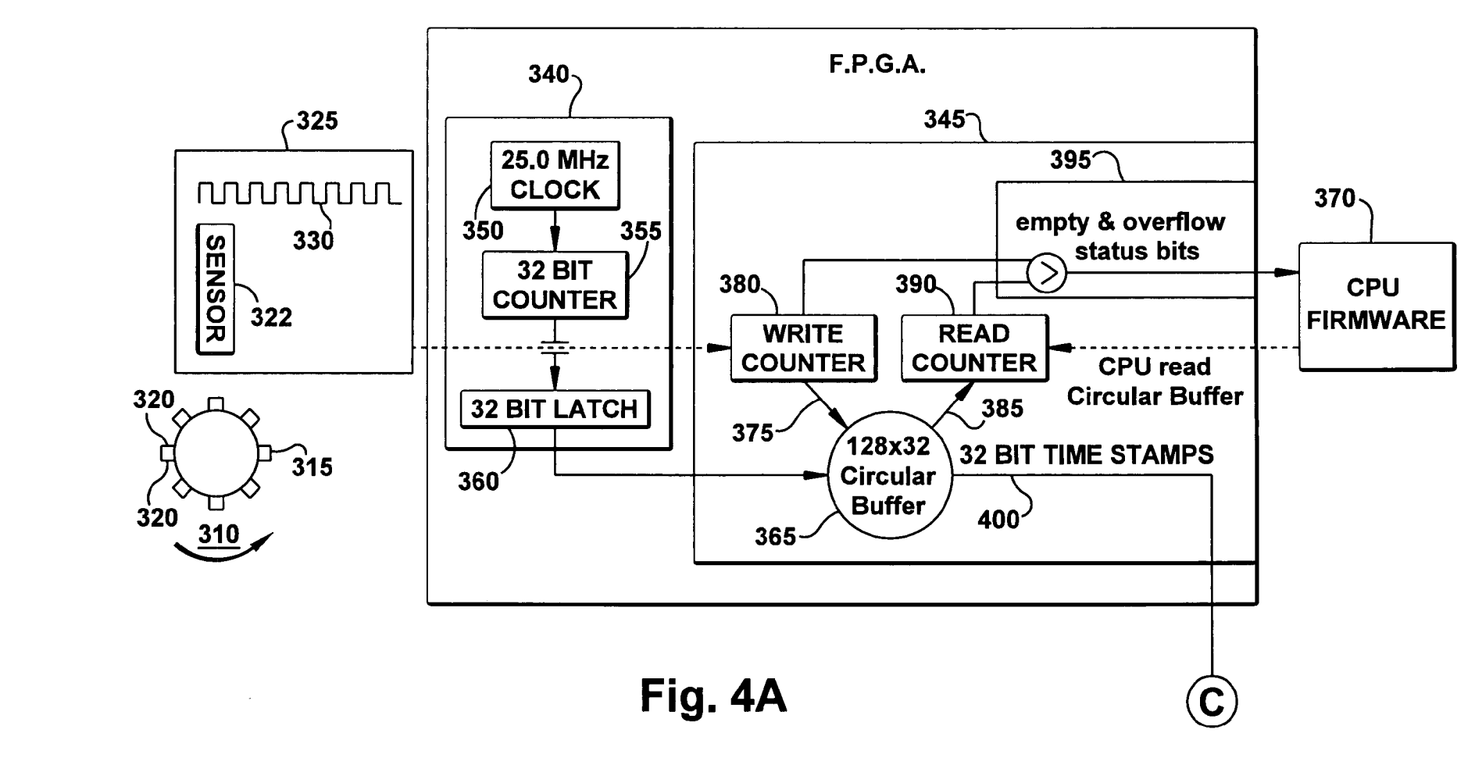
FIGS. 4A and 4B illustrates an inventive system for applying a tooth correction method to frequency, speed and acceleration determinations for a rotating device.
Figure 4B:
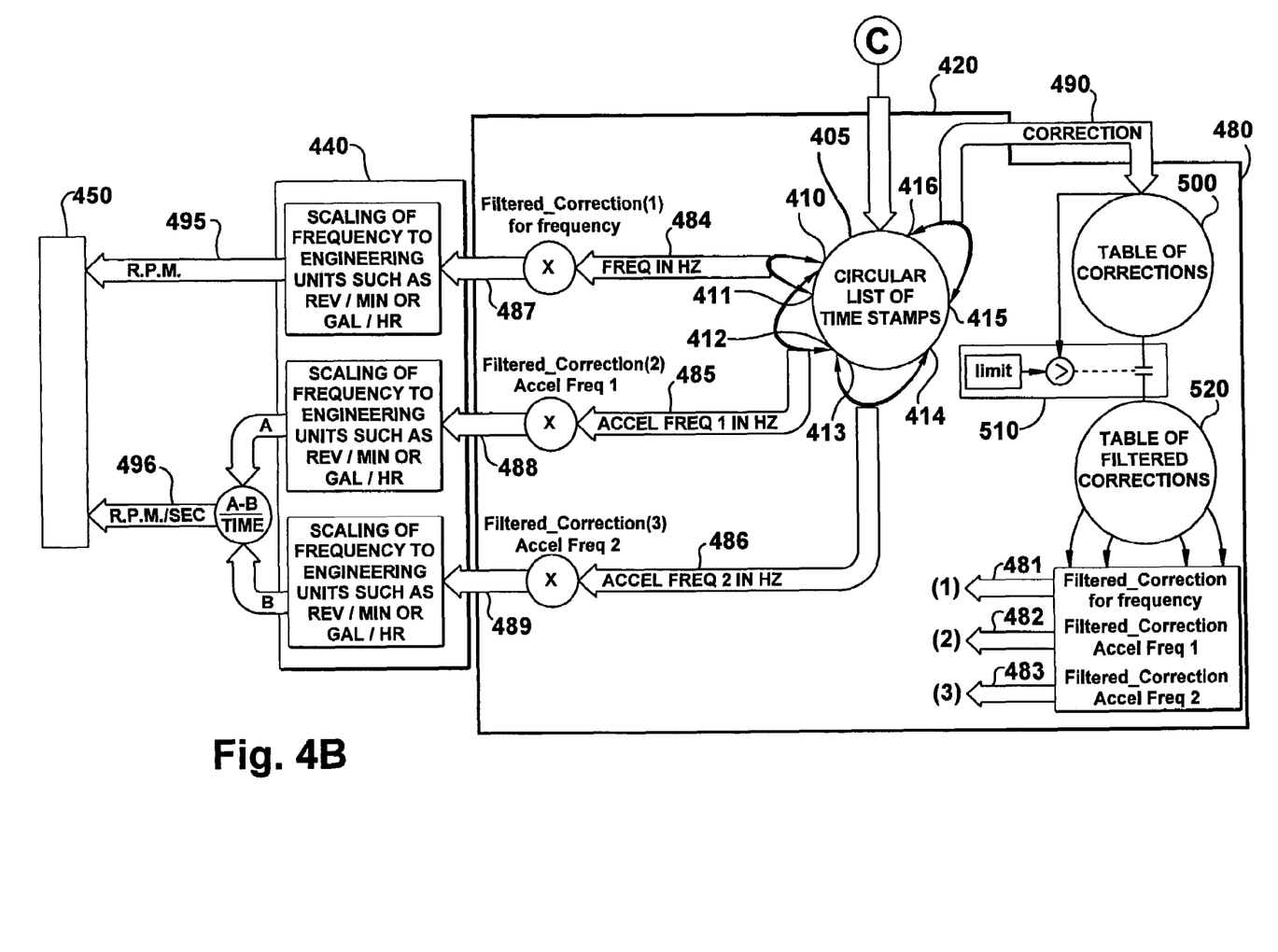

FIGS. 4A and 4B illustrate an inventive system for applying the tooth correction method, as described above, to frequency, speed and acceleration determinations for a rotating device. The system includes a rotating device including a speed wheel 310 with multiple teeth 315, where the teeth incorporate rising and falling edges 320. A sensor means 325 senses the rising edge of each tooth 315 with sensor 322 and outputs digital pulses 330 representing the rising edge of each tooth (alternatively, falling edges may be used). A counting means 340 responds to the digital pulses 330 to provide a timed count to the input of the digital pulses 330. The counting means 340 may include a clock 350, a counter 355, and a holding register 360. Upon sensing the digital pulse, the counter value may be latched in the holding register 360. A storing means 345 may further be provided for storing of the counter value associated with specific edges 320 of the teeth of the speed wheel 310. The storing means may include a circular buffer 365, which is updated with a count value held in the holding register 360 upon a write strobe when a digital pulse 330 is sensed. The counted value is stored at a storage location in the circular buffer 365 determined by a write pointer 375. When the write is complete, the write pointer 385 is incremented. A CPU 370 can read the internal state of the circular buffer in a status register 395. The state is determined by the counts of the write pointer 375 and the read pointer 385.

A calculating means 420 calculates the timing between events related to the sensing of tooth edges 320 of the speed wheel 310. Elements of the circular buffer may contain a 32-bit value of the free-running counter 355 that is captured when the edge on the toothed wheel is sensed. These circular buffer elements are referred to as TICs. The CPU 370 uses the contents of the internal circular buffer 365 to determine the time difference between the occurrences of the digital pulses 330. The elements of the circular buffer 365 are time stamped 400, the pointer defining the most recent element entry and previous entries as $t_n$, $t_{n-1}$, $t_{n-2}$, etc. By using the pointers to recover specific elements, the CPU 370 may calculate the time difference between the associated events for frequency, speed and acceleration determinations according to Equations 1-4. These elements are made available in a circular list of time stamps 405. The arrows 410-414 on the circular list of time stamps 405 represent specific events being picked off for determination of individual rotation-related parameters. For example, arrows 410-411 may represent the time stamps associated with two successive events (the sensing of tooth edges) upon which a calculation to determine frequency 484 will be performed. Similarly, arrows 410/412, and 413/414 represent the time stamps for the two events providing inputs for speed calculations associated with speed signals 485 and 486, upon which an acceleration signal 496 will be calculated. Signals 484, 485 and 486 are uncorrected values for frequency and speed determinations.

A correcting means 480 determines tooth correction 490 for each span between teeth 315 at each revolution of the speed wheel 310. The tooth corrections 490 are calculated according to Equation 5 and utilized in frequency, speed and acceleration calculations according to Equations 6-9. The tooth corrections 490 are developed using time stamped values taken from the circular list of time stamps 405, as represented by arrows 415/416, using Equations 6-9. The tooth corrections 490, when calculated, are stored in a table of corrections 500. A limits test 510 is performed on each new tooth correction to determine if the new tooth correction falls within a predetermined limit of the associated old tooth corrections for each span. If the new tooth correction falls within the limit value, then the new tooth correction values are used in a table of filtered corrections 520. If a new tooth correction falls outside the predetermined limit, then the new tooth correction and succeeding new tooth values is not be utilized for the table of filtered corrections 520 until a full revolution the speed wheel has occurred in which all new tooth values are within the limit.

The correcting means 480 determines filtered tooth corrections 481-483 according to an algorithm that weights a current filtered tooth correction with a new tooth correction value. The correcting means provides this filtered tooth correction according to previously described, Equation 10.

The correcting means 480 further provides filtered tooth corrections 481, 482 and 483 to the associated unfiltered frequency and speed signals 484, 485 and 486 to provide filtered and corrected signals 487, 488 and 489 for speed and acceleration calculations, according to previously described Equations 12-16. The calculated frequency (teeth/sec) and acceleration (teeth/sec$^2$) may then scaled to engineering units (for example Revolution/Minute or Gallons/Hour) by a scaling function 440, and output to a system controller 450. The system controller 450 utilizes the speed input 495 and the acceleration input 496, along with other system inputs (not shown) for turbine control.

The above describes an implementation of pulse sensing, storage and recovery, however, the invention is not limited to this implementation and such a process may be implemented by various other hardware and software combinations.

Figure 5:
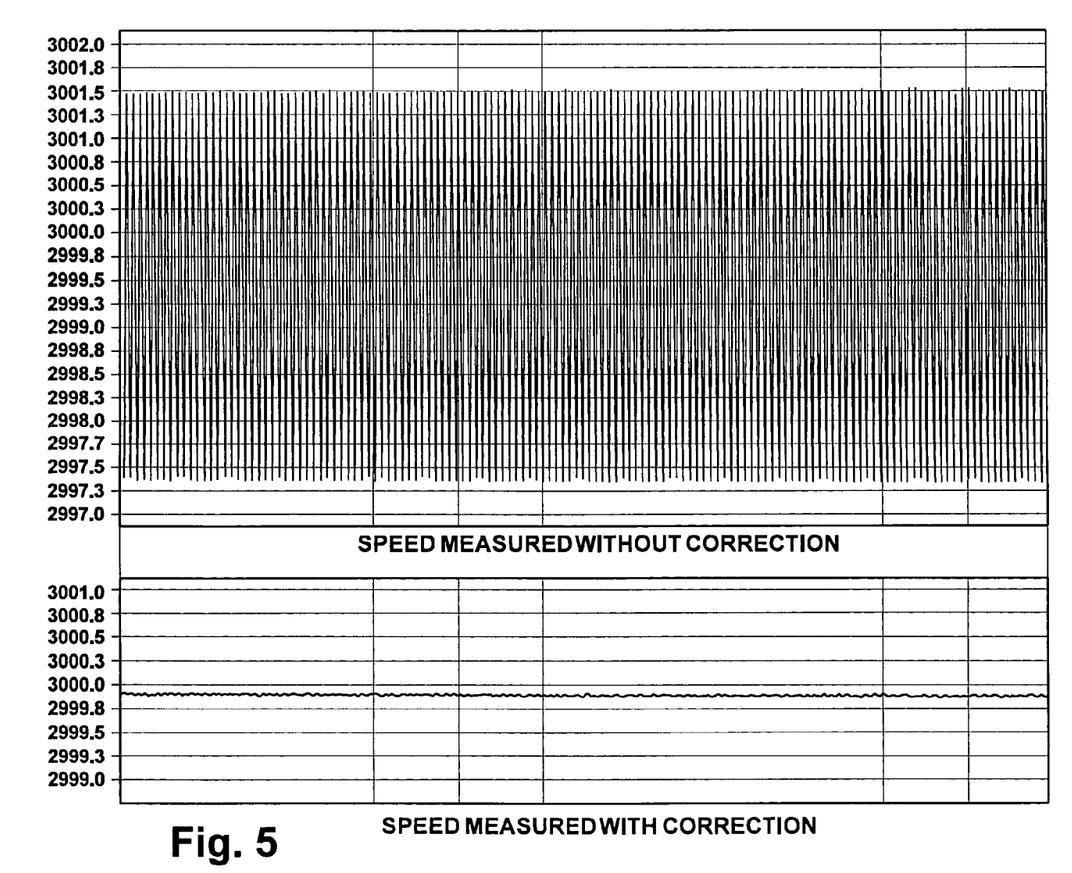
FIG. 5 illustrates a comparative improvement in speed calculation utilizing the inventive tooth correction method.

FIG. 5 illustrates a comparative improvement in speed calculation utilizing the inventive speed tooth correction. Before application of the inventive speed tooth correction factor, a typical turbine speed pulse rate variation due to teeth machining errors is shown in the Speed Measured Without Correction graph. The improved result with the speed correction algorithm applied is shown in the Speed Measured With Correction Chart. The speed oscillations that occur before application of the inventive algorithm to the frequency, speed and acceleration calculations are substantially reduced with the application of the tooth correction factor algorithm.

Application of the above-described equations for frequency, speed and acceleration will similarly permit correction and thus improve accuracy of any functions for the rotating equipment, that utilize speed of rotation. Flow rate determinations, for example, where flow is directly proportional to rotation of a pump shaft or flow meter rotation may be improved by utilization of the inventive algorithms.

Use of the algorithm provides the improved accuracy of speed and acceleration values with no necessity of re-machining of teeth in the field to reduce the errors. Use of the tooth correction algorithm may also permit the tolerance in the gear teeth machining to be widened, because the algorithm can substantially correct for the widened spacing. Both avoiding re-machining in the field and permitting wider tolerances in the initial gear teeth machining will reduce costs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for calculating rotation-dependent parameters in a system that senses multiple teeth during a single shaft rotation of a toothed speed wheel, the method comprising:

sensing passing edges of multiple gear teeth on the toothed speed wheel;

generating a signal pulse at one of rising and falling edges of the gear teeth;

measuring time between the generated signal pulses;

calculating a tooth correction for the span between at least one of rising and falling edges of successive gear teeth according to:

$$\text{Correction } [ti] = \frac{TICS[t_n] - TICS[t_{n-1}]}{\sum_{k=0}^{N-1} TICS[t_{n-k}]};$$

and applying the tooth correction to the rotation-dependent parameter calculation according to:

$$Freq(\text{Hz}) = \frac{1}{(TICS[t_n] - TICS[t_{n-1}])/25000000}$$

$$Speed_1 = \frac{1}{(TICS[t_n] - TICS[t_{n-1}])/25000000}$$

$$\left(\frac{\text{Teeth}}{\text{Sec}}\right) * (\text{tooth correction}[ti]) * \left[\frac{\text{Teeth}}{rev}\right]$$

$$Speed_0 = \frac{1}{(TICS[t_{n-1}] - TICS[t_{n-2}])/25000000}$$

$$\left(\frac{\text{Teeth}}{\text{Sec}}\right) * (\text{tooth correction}[ti-1]) * \left[\frac{\text{Teeth}}{rev}\right]$$

$$\text{Acceleration}\left(\frac{\text{Hz}}{\text{Sec}}\right) = \frac{Speed_1 - Speed_0}{(TICS_{t_n} - TICS_{t_{n-2}})/25000000}\left(\frac{\text{Teeth}}{\text{Sec}^2}\right)$$

where TICS represents circular buffer elements storing counter values associated with pulses, N represents the number of teeth on the speed wheel, $t_n$ represents a pointer to the latest TIC entry in a circular buffer, $t_{n-1}$ is the pointer one entry back from $t_n$, $t_{n-k}$ is the pointer k entries back from $t_n$, [ti] represents $t_n$, Modulus N, and tooth correction [ti] represents the tooth correction associated with an individual span.

2. The method for calculating rotation-dependent parameters as claimed in claim 1, wherein the rotation dependent parameter being calculated comprises a speed of rotation.

3. The method for calculating rotation-dependent parameters as claimed in claim 1, wherein the rotation dependent parameter being calculated comprises an acceleration of rotation.

4. The method for calculating of rotation-dependent parameters as claimed in claim 1, wherein the rotation dependent parameter being calculated comprises a flow rate.

5. The method of claim 1, wherein the step of applying the the tooth collection to the rotation-dependent parameter calculation further comprises scaling at least one of a frequency, speed, acceleration and flow calculation to engineering units.

6. The method of claim 1, wherein the step of applying the tooth correction to the rotation-dependent parameter calculation comprises testing whether to apply a new determined tooth correction according to the algorithm:

If the absolute value of the difference between the new tooth correction and the old tooth correction faction is less than a limit value multiplied by the old tooth correction, then apply the new tooth correction; otherwise apply the old tooth corrections until a next revolution of the speed wheel in which all new tooth corrections are within the limit.

7. The method of claim 6, further comprising applying a filtering scheme to the calculation of a tooth correction including weighting a filtered correction value and the new tooth correction value.

8. The method of claim 7 wherein the step of applying the filtering scheme further comprises applying the scheme according to:

Filtered Correction [ti]=(Filtered Correction [ti]
*W1)+(new tooth correction [ti]*W2), wherein
W1 and W2 represent weighting factors.

9. The method of claim 8, wherein the application of the filter scheme comprises calculating the parameters according to:

$$Freq(\text{Hz}) = \frac{1}{(TICS[t_n] - TICS[t_{n-1}])/25000000}$$

$$\left(\frac{\text{Teeth}}{\text{Sec}}\right) * \left(\frac{\text{Filtered\_correction }[ti]}{\sum \text{Filtered\_corrections}}\right) * \left[\frac{\text{Teeth}}{rev}\right]$$

$$Speed_1 = \frac{1}{(TICS[t_n] - TICS[t_{n-1}])/25000000}$$

$$\left(\frac{\text{Teeth}}{\text{Sec}}\right) * \left(\frac{\text{Filtered\_correction }[ti]}{\sum \text{Filtered\_corrections}}\right) * \left[\frac{\text{Teeth}}{rev}\right]$$

-continued $$Speed_0 = \frac{1}{(TICS[t_{n-1}] - TICS[t_{n-2}])/25000000}$$
$$\left(\frac{\text{Teeth}}{\text{Sec}}\right) * \left(\frac{\text{Filtered\_correction }[ti-1]}{\Sigma \text{ Filtered\_corrections}}\right) * \left[\frac{\text{Teeth}}{\text{rev}}\right]$$

$$\text{Acceleration}\left(\frac{\text{Hz}}{\text{Sec}}\right) = \frac{Speed_1 - Speed_0}{(TICS[t_n] - TICS[t_{n-2}])/25000000}\left(\frac{\text{Teeth}}{\text{Sec}^2}\right)$$

where $\Sigma$ Filtered_corrections is the summation of filtered corrections for the spans during the last full revolution of speed wheel.

10. The method of claim 7, the method further comprising initializing the filtered correction upon power up, occurrence of a lost pulse, occurrence of an invalid pulse, and zero speed determination.

11. The method of claim 7, the method step of initializing further comprising copying correction table values directly into the filter following a predetermined number of revolutions following initialization.

12. A method for calculating rotation-dependent parameters in a system that senses multiple teeth during a single shaft rotation of a toothed speed wheel, the method comprising:
sensing passing edges of multiple gear teeth on the toothed speed wheel;
generating a signal pulse at one of rising and falling edges of the gear teeth;
measuring time between the generated signal pulses;
calculating filtered tooth corrections for the spans between at least one of rising and falling edges of successive gear teeth; and
applying the tooth corrections to the rotation-dependent parameter calculations according to:

$$Freq(\text{Hz}) = \frac{\text{span}}{(TICS[t_n] - TICS[t_{n-span}])/25000000}$$
$$\left(\frac{\text{Teeth}}{\text{Sec}}\right) * \left(\frac{\sum_{i=ti}^{ti-span} \text{Filtered\_correction}[i]}{\Sigma \text{ Filtered\_corrections}}\right) * \left[\frac{\text{Teeth}}{\text{rev}}\right]$$

where span represents the number of teeth that passed the pulse input sensor in x ms (minimum of 1); TICS represents circular buffer elements storing counter values associated with pulses; N represents the number of teeth on the speed wheel; $t_n$ represents a pointer to the latest TIC entry in a circular buffer; $t_{n-1}$ is the pointer one entry back from $t_n$, $t_{n-k}$ is the pointer k entries back from $t_n$, [ti] represents $t_n$ Modulus N; tooth correction [ti] represents the tooth correction associated with an individual span; and $t_{n+span}$ as the pointer x ms back from $t_n$; and 4) $t_{n+(2*span)}$ as the pointer 2*x ms back from $t_n$.

13. A system for calculation of rotation dependent parameters by sensing shaft rotation of a toothed speed wheel, the system comprising:
a rotating device including a speed wheel with multiple teeth;
a sensor means for determining the edges for the multiple teeth as the speed wheel rotates;
a counting means for timing the passing of the edges for successive teeth of the speed wheel;
a storing means for storing the time of the passing of the edges for successive teeth of the speed wheel;
a calculating means for determining the passage of time between the edges for successive teeth of the speed wheel; and
a correcting means for determining correction for the speed of the speed wheel using a tooth correction by determining uneven spacing of the tooth edges of the speed wheel according to the equations:

$$\text{Correction }[ti] = \frac{TICS[t_n] - TICS[t_{n-1}]}{\sum_{k=0}^{N-1} TICS[t_{n-k}]}$$

wherein the correcting means determines tooth corrections according to the equations:

$$Freq(\text{Hz}) = \frac{1}{(TICS[t_n] - TICS[t_{n-1}])/25000000}$$
$$\left(\frac{\text{Teeth}}{\text{Sec}}\right) * (\text{tooth correction}[ti]) * \left[\frac{\text{Teeth}}{\text{rev}}\right]$$

$$Speed_1 = \frac{1}{(TICS[t_n] - TICS[t_{n-1}])/25000000}$$
$$\left(\frac{\text{Teeth}}{\text{Sec}}\right) * (\text{tooth correction}[ti]) * \left[\frac{\text{Teeth}}{\text{rev}}\right]$$

$$Speed_0 = \frac{1}{(TICS[t_{n-1}] - TICS[t_{n-2}])/25000000}$$
$$\left(\frac{\text{Teeth}}{\text{Sec}}\right) * (\text{tooth correction}[ti-1]) * \left[\frac{\text{Teeth}}{\text{rev}}\right]$$

$$\text{Acceleration}\left(\frac{\text{Hz}}{\text{Sec}}\right) = \frac{Speed_1 - Speed_0}{(TICS_{t_n} - TICS_{t_{n-2}})/25000000}\left(\frac{\text{Teeth}}{\text{Sec}^2}\right)$$

where TICS represents circular buffer elements storing counter values associated with pulses, N represents the number of teeth on the speed wheel, $t_n$ represents a pointer to the latest TIC entry in a circular buffer, $t_{n-1}$ is the pointer one entry back from $t_n$, $t_{n-k}$ is the pointer k entries back from $t_n$, [ti] represents $t_n$ Modulus N, and tooth correction [ti] represents the tooth correction associated with an individual span.

14. The system for calculation of rotation dependent parameters by sensing rotation of a toothed speed wheel according to claim 13, wherein the correcting means further comprises a filtering scheme to the calculation of a tooth correction.

15. The system for calculation of rotation dependent parameters by sensing shaft rotation of a toothed speed wheel according to claim 14, wherein the correcting means further comprises applying tooth corrections according to the $$Freq(\text{Hz}) = \frac{1}{(TICS[t_n] - TICS[t_{n-1}])/25000000}$$
$$\left(\frac{\text{Teeth}}{\text{Sec}}\right) * \left(\frac{\text{Filtered\_correction }[ti]}{\Sigma \text{ Filtered\_corrections}}\right) * \left[\frac{\text{Teeth}}{\text{rev}}\right]$$

$$Speed_1 = \frac{1}{(TICS[t_n] - TICS[t_{n-1}])/25000000}$$
$$\left(\frac{\text{Teeth}}{\text{Sec}}\right) * \left(\frac{\text{Filtered\_correction }[ti]}{\Sigma \text{ Filtered\_corrections}}\right) * \left[\frac{\text{Teeth}}{\text{rev}}\right]$$

$$Speed_0 = \frac{1}{(TICS[t_{n-1}] - TICS[t_{n-2}])/25000000}$$
$$\left(\frac{\text{Teeth}}{\text{Sec}}\right) * \left(\frac{\text{Filtered\_correction }[ti-1]}{\Sigma \text{ Filtered\_corrections}}\right) * \left[\frac{\text{Teeth}}{\text{rev}}\right]$$

-continued $$\text{Acceleration}\left(\frac{\text{Hz}}{\text{Sec}}\right) = \frac{Speed_1 - Speed_0}{(TICS[t_n] - TICS[t_{n-2}])/25000000}\left(\frac{\text{Teeth}}{\text{Sec}^2}\right)$$

where Σ Filtered_corrections is the summation of filtered corrections for the spans during the last full revolution of speed wheel.

16. The system for calculation of rotation dependent parameters by sensing shaft rotation of a toothed speed wheel according to claim 14, wherein the correcting means further comprises application of the filtered tooth corrections if the tooth corrections obey a limit according to the algorithm:

If the absolute value of the difference between a new tooth correction and an old tooth correction is less than a limit value multiplied by the old tooth correction, then apply the new tooth correction; otherwise apply the old tooth corrections until a next revolution of the speed wheel in which all new tooth corrections are within the limit.

\* \* \* \* \*